(12) United States Patent
Naseer-Ul-Islam et al.

(10) Patent No.: US 12,089,098 B2
(45) Date of Patent: Sep. 10, 2024

(54) FEEDBACK ON NETWORK-ASSISTED FALLBACK TO CONTENTION-BASED RANDOM ACCESS

(71) Applicant: Nokia Technologies Oy, Espoo (FI)

(72) Inventors: Muhammad Naseer-Ul-Islam, Munich (DE); Ahmad Awada, Munich (DE); Andreas Lobinger, Grafing (DE)

(73) Assignee: Nokia Technologies Oy, Espoo (FI)

( * ) Notice: Subject to any disclaimer, the term of this patent is extended or adjusted under 35 U.S.C. 154(b) by 378 days.

(21) Appl. No.: 17/633,238

(22) PCT Filed: Aug. 14, 2019

(86) PCT No.: PCT/EP2019/071868
§ 371 (c)(1),
(2) Date: Feb. 7, 2022

(87) PCT Pub. No.: WO2021/028048
PCT Pub. Date: Feb. 18, 2021

(65) Prior Publication Data
US 2022/0295361 A1    Sep. 15, 2022

(51) Int. Cl.
*H04W 4/00* (2018.01)
*H04W 36/00* (2009.01)
(Continued)

(52) U.S. Cl.
CPC ... *H04W 36/0072* (2013.01); *H04W 36/0058* (2018.08); *H04W 74/004* (2013.01); *H04W 74/0833* (2013.01)

(58) Field of Classification Search
CPC ......... H04W 36/0072; H04W 36/0058; H04W 74/004; H04W 74/0833
See application file for complete search history.

(56) References Cited

U.S. PATENT DOCUMENTS 10,945,175 B2 * 3/2021 Sabouri-Sichani ... H04W 36/08
11,419,015 B2 * 8/2022 Da Silva ........... H04W 36/0058
(Continued)

FOREIGN PATENT DOCUMENTS

WO    2019/108114 A1    6/2019
WO    2021/028047 A1    2/2021

OTHER PUBLICATIONS

"3rd Generation Partnership Project; Technical Specification Group Radio Access Network; NR; NR and NG-RAN Overall Description; Stage 2 (Release 15)", 3GPP TS 38.300, V15.5.0, Mar. 2019, pp. 1-97.
(Continued)

*Primary Examiner* — Abdelnabi O Musa
(74) *Attorney, Agent, or Firm* — Barta Jones, PLLC

(57) ABSTRACT

There are provided measures for feedback on network-assisted fallback to contention-based random access. Such measures exemplarily comprise, at a terminal connected to at least one network slice and being subject to a handover from a source access point to a target access point, receiving a handover command message including handover assistance information indicative of a first pool of random access channel resources to be used by said terminal upon fallback to contention-based random access during a handover processing, selecting first random access channel resources as attempt random access channel resources from said first pool of random access channel resources, attempting random access to said target access point utilizing said attempt random access channel resources, storing, if said attempting random access to said target access point utilizing said attempt random access channel resources is unsuccessful, attempt related information to an attempt failure list, and transmitting, if said attempting random access to said target access point utilizing said attempt random access channel (Continued)

resources is successful, said attempt failure list to said target access point.

20 Claims, 15 Drawing Sheets

(51) Int. Cl.
*H04W 74/00* (2009.01)
*H04W 74/0833* (2024.01)

(56) References Cited

U.S. PATENT DOCUMENTS

| | | | | |
|---|---|---|---|---|
| 2019/0150052 | A1* | 5/2019 | Wang | H04W 36/385 |
| | | | | 370/331 |
| 2019/0182703 | A1* | 6/2019 | Huang | H04W 24/10 |
| 2021/0360503 | A1* | 11/2021 | Lu | H04W 36/0058 |
| 2022/0022112 | A1* | 1/2022 | Lu | H04W 74/0841 |
| 2022/0030470 | A1* | 1/2022 | You | H04W 36/0011 |
| 2022/0279408 | A1* | 9/2022 | Awada | H04W 74/0833 |
| 2022/0361062 | A1* | 11/2022 | Stanczak | H04W 36/0072 |

OTHER PUBLICATIONS

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

"3rd Generation Partnership Project; Technical Specification Group Services and System Aspects; System Architecture for the 5G System; Stage 2 (Release 16)", 3GPP TS 23.501 V16.0.2, Apr. 2019, pp. 1-317.

"3rd Generation Partnership Project; Technical Specification Group Radio Access Network; NR; Medium Access Control (MAC) protocol specification (Release 15)", 3GPP TS 38.321, V15.5.0, Mar. 2019, pp. 1-78.

"3rd Generation Partnership Project; Technical Specification Group Radio Access Network; Study on new radio access technology: Radio access architecture and interfaces (Release 14)", 3GPP TR 38.801, V14.0.0, Mar. 2017, pp. 1-91.

"RACH isolation for Slices", 3GPP TSG-RAN WG2 NR Adhoc, R2-1700121, Agenda: 3.5, Nokia, Jan. 17-19, 2017, 3 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.5.1, Apr. 2019, pp. 1-948.

International Search Report and Written Opinion received for corresponding Patent Cooperation Treaty Application No. PCT/EP2019/071868, dated Apr. 7, 2020, 17 pages.

"Remaining issues of beam selection for handover access", 3GPP TSG-RAN WG2 Meeting #99bis, R2-1711365, Agenda: 10.4.1.5.1, Qualcomm Incorporated, Oct. 9-13, 2017, pp. 1-4.

"TP on solutions for RACH optimisation", 3GPP TSG-RAN WG3 #104, R3-193063, Agenda: 25.2.3.3, Ericsson, May 13-17, 2019, 3 pages.

"Email discussion [104#45]: RACH Report—What and how to report", 3GPP TSG-RAN WG2 Meeting #105, R2-1901640, Agenda: 12.2.6, Qualcomm Incorporated, Feb. 25-Mar. 1, 2019, 18 pages.

Office Action received for corresponding European Patent Application No. 19755878.6, dated Mar. 22, 2024, 3 pages.

* cited by examiner

FEEDBACK ON NETWORK-ASSISTED FALLBACK TO CONTENTION-BASED RANDOM ACCESS

RELATED APPLICATION

This application claims priority to PCT Application No. PCT/EP2019/071868, filed on Aug. 14, 2019, each of which is incorporated herein by reference in its entirety.

FIELD

The present invention relates to feedback on network-assisted fallback to contention-based random access. More specifically, the present invention exemplarily relates to measures (including methods, apparatuses and computer program products) for realizing feedback on network-assisted fallback to contention-based random access.

BACKGROUND

The present specification generally relates to the Random-Access Channel (RACH) procedure in $3^{rd}$ Generation Partnership Project (3GPP) 5G New Radio (NR).

The random-access procedure is triggered by a number of events.

Namely, the random-access procedure is triggered upon an initial access from an radio resource control (RRC) Idle mode, upon an RRC connection re-establishment procedure, upon a handover, upon downlink (DL) or uplink (UL) data arrival during RRC Connected when the UL synchronization status is non-synchronized, upon UL data arriving during RRC Connected where there are no Physical Uplink Control Channel (PUCCH) resources for Scheduling Request (SR), upon an SR failure, upon a request by RRC upon synchronous reconfiguration, upon a transition from RRC Inactive, upon a request for other System Information (SI), upon a beam failure recovery, and to establish time alignment of Secondary Cell (SCell) addition in dual connectivity.

Moreover, the random-access procedure takes two distinct forms, namely the Contention-Based Random Access (CBRA) and the Contention-Free Random Access (CFRA).

FIG. 8 shows a schematic diagram of an exemplary system environment with signaling variants of a random-access procedure.

In particular, FIG. 8 shows signaling according to contention-based random access.

In a first step in FIG. 8 ("1"), a user equipment (UE) selects one RACH preamble out of a configured set and transmits the preamble in one of the pre-determined RACH occasions.

In a second step in FIG. 8 ("2"), a gNB sends a Random-Access Response (RAR) generated by a Medium Access Control (MAC) layer. The RAR provides timing advance, initial UL grant to send Msg3 (Message 3) and assignment of temporary Cell-Radio Network Temporary Identifier (C-RNTI).

In a third step in FIG. 8 ("3"), using the UL grant provided in RAR, the UE sends Msg3 to the gNB. The content for Msg3 depends on whether the UE performs initial access (Msg3 would be RRCSetupRequest), RRC re-establishment (Msg3 would be RRCReestablishment), or handover (Msg3 would be RRCReconfigurationComplete) or beam failure recovery (Msg3 would consist of C-RNTI MAC CE).

In a fourth step in FIG. 8 ("4"), contention resolution is performed in Msg4 (Message 4). UEs that experienced contention during random access, i.e., due to possible collision in preamble transmission, have to repeat the RACH procedure.

FIG. 9 shows a schematic diagram of an exemplary system environment with signaling variants of a random-access procedure.

In particular, FIG. 9 shows signaling according to contention-free random access.

In a first step in FIG. 9 ("0"), the network configures the UE with dedicated RACH preamble(s). This is done e.g. with a Handover (HO) Command.

In a second step in FIG. 9 ("1"), when performing the RACH access, the UE transmits the dedicated RACH preamble in one of the pre-configured RACH occasions.

In a third step in FIG. 9 ("2"), the RACH access procedure is completed when UE successfully receives the RAR.

During the handover from source to target cell, the UE is typically configured to perform CFRA toward the target cell. For this, the target cell indicates to the UE—in the handover command—dedicated RACH preambles to be used for accessing the target cell.

The dedicated RACH preambles can be associated either with synchronization signal blocks (SSB) or channel state information reference signals (CSI-RS).

FIG. 10 shows a schematic diagram of an exemplary system environment with signaling variants of a conditional handover procedure.

Conditional handover (CHO) is being discussed for NR Rel. 16.

The CHO is very similar to the legacy handover.

The first steps of the CHO procedure ("Phase 1: CHO preparation") are identical to the legacy handover. A configured event triggers the UE to send a measurement report. Based on this report, the source typically prepares the target for the handover (Handover Request+Handover Request Acknowledgement) and then sends a handover command to the UE.

For the legacy HO, the UE will immediately access the target cell to complete the handover.

However, as is derivable from FIG. 10 ("Phase 2: CHO execution"), for CHO, the UE will only access the target once an additional CHO execution condition expires (i.e. the HO preparation and execution phases are decoupled). The condition is typically configured, e.g. by the source during HO Command.

The advantage of the CHO is that the HO command can be sent very early, when the UE is still safe in the source cell, without risking the access in and the stability of the target cell. That is, conditional handover provides mobility robustness.

Network slicing is a key 5G feature to support different services using the same underlying mobile network infrastructure. Network slices can differ either in their service requirements like Ultra-Reliable Low Latency Communication (URLLC) and enhanced Mobile Broadband (eMBB) or the tenant that provides those services.

From network management perspective, different network slices can also have different key performance indicator targets/optimization goals. For example, for URLLC service, any kind of HO failures, outages, and service interruption would be critical and should be avoided as much as possible. However, for eMBB service, HO failures and service interruption would be relatively less critical than in URLLC, i.e., has more relaxed requirements.

A network slice is identified via an S-NSSAI (Single-Network Slice Selection Assistance Information).

FIG. 11 is a schematic diagram illustrating a structure of an identification information element. In particular, FIG. 11 illustrates a format of the s-NSSAI.

Currently, a UE is allowed to be simultaneously connected and served by at most eight S-NSSAIs. However, there is no limit on the number of network slices that each cell may support. In particular, the cell may support tens or even hundreds of S-NSSAIs.

The S-NSSAI may include both a Slice Service Type (SST) field and a Slice Differentiator (SD) field with a total length of 32 bits, or may include only the SST field part in which case the length of S-NSSAI is only 8 bits.

The SST field may have standardized and non-standardized values. Values 0 to 127 may belong to the standardized SST range. The values 0 to 127 may correspond to those defined in "3GPP Technical Specification (TS) 23.501, System Architecture for the 5G system (Release 15)". For instance, an SST value of 1 may indicate that the slice is suitable for handling of 5G eMBB, and an SST value of 2 may indicate that the slice is suitable for handling of URLLC. The SD field may be operator-defined only.

FIG. 12 is a schematic diagram of a of a random-access procedure implementing contention-free random access and contention-based random access.

In particular, FIG. 12 summarizes the selection of a RACH preamble.

As can be seen n FIG. 12, if the UE has been explicitly configured by the network (e.g. in handover command) with CFRA resources that are associated with SSBs/CSI-RSs and at least one of these SSBs/CSI-RSs has L1-Reference Signal Received Strength (RSRP) above a certain threshold Qin_LR, then the UE selects an SSB/CSI-RS among the associated SSBs/CSI-RSs having L1-RSRP above threshold Qin_LR (Link Recovery) and uses the dedicated CFRA resources corresponding to the selected SSB/CSI-RS for performing the random access.

If none of the SSB/CSI-RS associated with CFRA has a L1-RSRP above threshold Qin_LR, the UE fallbacks to perform CBRA.

Herein, the UE checks first if at least one of the SSBs with a L1-RSRP above another threshold rsrp-ThresholdSSB is available.

If such SSB(s) with a L1-RSRP above another threshold rsrp-ThresholdSSB is/are available, the UE selects an SSB with L1-RSRP above the threshold rsrp-ThresholdSSB, otherwise the UE selects any SSB. In both cases, the UE performs CBRA on the selected SSB.

It has been discussed that RACH resources (preamble, time/frequency resources) could be split among different groups of UEs pertaining to e.g., different network slices resulting in so-called pools of RACH resources.

In view thereof, the target cell might provide some assistance information related to which pool of CBRA resources the UE should use in case it needs to fall back from CFRA to CBRA.

In such case, the network only knows about successful random-access attempts.

However, the problem arises that the network does not have detailed information about unsuccessful attempts. This would make it impossible for the network to evaluate the effectiveness of such assistance information it might have provided for the CBRA fallback.

The performance of the assistance information could be impacted for example if the UE changes its connected network slices in between the HO preparation and HO execution, for example in CHO scenario. Additionally, the load on a specific pool of random-access resources might have changed after the assistance information was provided.

Hence, there is a need to provide for feedback on network-assisted fallback to contention-based random access.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method of a terminal connected to at least one network slice and being subject to a handover from a source access point to a target access point, the method comprising receiving a handover command message including handover assistance information indicative of a first pool of random access channel resources to be used by said terminal upon fallback to contention-based random access during a handover processing, selecting first random access channel resources as attempt random access channel resources from said first pool of random access channel resources, attempting random access to said target access point utilizing said attempt random access channel resources, storing, if said attempting random access to said target access point utilizing said attempt random access channel resources is unsuccessful, attempt related information to an attempt failure list, and transmitting, if said attempting random access to said target access point utilizing said attempt random access channel resources is successful, said attempt failure list to said target access point.

According to an exemplary aspect of the present invention, there is provided a method of a target access point being a target of a handover of a terminal connected to at least one network slice from a source access point, the method comprising receiving an attempt failure list including entries of attempt related information related to random access attempts of said terminal to said target access point utilizing a first pool of random access channel resources to be used by said terminal upon fallback to contention-based random access during a handover processing indicated by handover assistance information provided by said target access point, adjusting an allocation of a plurality of pools of random access channel resources to be used for contention-based random access processing based on content of said attempt failure list, and adjusting a definition of handover assistance information for defining handover assistance information to be provided to terminals designated for handover towards said target cell based on said content of said attempt failure list.

According to an exemplary aspect of the present invention, there is provided a method of a recovery access point to which a terminal connected to at least one network slice and being subject to a handover from a source access point to a target access point is connected to upon a failure condition with respect to random access attempts to said target access point being met, the method comprising receiving, from said terminal, an attempt failure list including entries of attempt related information related to random access attempts of said terminal to said target access point utilizing a first pool of random access channel resources to be used by said terminal upon fallback to contention-based random access during a handover processing indicated by handover assistance information provided by said target access point, and transmitting said attempt failure list to said target access point.

According to an exemplary aspect of the present invention, there is provided an apparatus of a terminal connected to at least one network slice and being subject to a handover from a source access point to a target access point, the apparatus comprising receiving circuitry configured to receive a handover command message including handover assistance information indicative of a first pool of random access channel resources to be used by said terminal upon fallback to contention-based random access during a handover processing, selecting circuitry configured to select first random access channel resources as attempt random access channel resources from said first pool of random access channel resources, attempting circuitry configured to attempt random access to said target access point utilizing said attempt random access channel resources, storing circuitry configured to store, if said attempting random access to said target access point utilizing said attempt random access channel resources is unsuccessful, attempt related information to an attempt failure list, and transmitting circuitry configured to transmit, if said attempting random access to said target access point utilizing said attempt random access channel resources is successful, said attempt failure list to said target access point.

According to an exemplary aspect of the present invention, there is provided an apparatus of a target access point being a target of a handover of a terminal connected to at least one network slice from a source access point, the apparatus comprising receiving circuitry configured to receive an attempt failure list including entries of attempt related information related to random access attempts of said terminal to said target access point utilizing a first pool of random access channel resources to be used by said terminal upon fallback to contention-based random access during a handover processing indicated by handover assistance information provided by said target access point, adjusting circuitry configured to adjust an allocation of a plurality of pools of random access channel resources to be used for contention-based random access processing based on content of said attempt failure list, and adjusting circuitry configured to adjust a definition of handover assistance information for defining handover assistance information to be provided to terminals designated for handover towards said target cell based on said content of said attempt failure list.

According to an exemplary aspect of the present invention, there is provided an apparatus of a recovery access point to which a terminal connected to at least one network slice and being subject to a handover from a source access point to a target access point is connected to upon a failure condition with respect to random access attempts to said target access point being met, the apparatus comprising receiving circuitry configured to receive, from said terminal, an attempt failure list including entries of attempt related information related to random access attempts of said terminal to said target access point utilizing a first pool of random access channel resources to be used by said terminal upon fallback to contention-based random access during a handover processing indicated by handover assistance information provided by said target access point, and transmitting circuitry configured to transmit said attempt failure list to said target access point.

According to an exemplary aspect of the present invention, there is provided an apparatus of a terminal connected to at least one network slice and being subject to a handover from a source access point to a target access point, the apparatus comprising at least one processor, at least one memory including computer program code, and at least one interface configured for communication with at least another apparatus, the at least one processor, with the at least one memory and the computer program code, being configured to cause the apparatus to perform receiving a handover command message including handover assistance information indicative of a first pool of random access channel resources to be used by said terminal upon fallback to contention-based random access during a handover processing, selecting first random access channel resources as attempt random access channel resources from said first pool of random access channel resources, attempting random access to said target access point utilizing said attempt random access channel resources, storing, if said attempting random access to said target access point utilizing said attempt random access channel resources is unsuccessful, attempt related information to an attempt failure list, and transmitting, if said attempting random access to said target access point utilizing said attempt random access channel resources is successful, said attempt failure list to said target access point.

According to an exemplary aspect of the present invention, there is provided an apparatus of a target access point being a target of a handover of a terminal connected to at least one network slice from a source access point, the apparatus comprising at least one processor, at least one memory including computer program code, and at least one interface configured for communication with at least another apparatus, the at least one processor, with the at least one memory and the computer program code, being configured to cause the apparatus to perform receiving an attempt failure list including entries of attempt related information related to random access attempts of said terminal to said target access point utilizing a first pool of random access channel resources to be used by said terminal upon fallback to contention-based random access during a handover processing indicated by handover assistance information provided by said target access point, adjusting an allocation of a plurality of pools of random access channel resources to be used for contention-based random access processing based on content of said attempt failure list, and adjusting a definition of handover assistance information for defining handover assistance information to be provided to terminals designated for handover towards said target cell based on said content of said attempt failure list.

According to an exemplary aspect of the present invention, there is provided an apparatus of a recovery access point to which a terminal connected to at least one network slice and being subject to a handover from a source access point to a target access point is connected to upon a failure condition with respect to random access attempts to said target access point being met, the apparatus comprising at least one processor, at least one memory including computer program code, and at least one interface configured for communication with at least another apparatus, the at least one processor, with the at least one memory and the computer program code, being configured to cause the apparatus to perform receiving, from said terminal, an attempt failure list including entries of attempt related information related to random access attempts of said terminal to said target access point utilizing a first pool of random access channel resources to be used by said terminal upon fallback to contention-based random access during a handover processing indicated by handover assistance information provided by said target access point, and transmitting said attempt failure list to said target access point.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

In view of the above, the present invention provides approaches on how to provide feedback to the network (target cell) in case the UE fallbacks to CBRA resources and utilizes the assistance information to select certain CBRA resource. The target cell can then use that feedback to optimize its decision about assistance information and proper CBRA fallback resource allocation from different pools of resources.

Any one of the above aspects enables an optimized assistance of UEs subject to handover in selection of a pool of RACH resources for the case of falling back to CBRA to thereby solve at least part of the problems and drawbacks identified in relation to the prior art.

By way of exemplary embodiments of the present invention, there is provided feedback on network-assisted fallback to contention-based random access.

More specifically, by way of exemplary embodiments of the present invention, there are provided measures and mechanisms for realizing feedback on network-assisted fallback to contention-based random access.

Thus, improvement is achieved by methods, apparatuses and computer program products enabling/realizing feedback on network-assisted fallback to contention-based random access.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
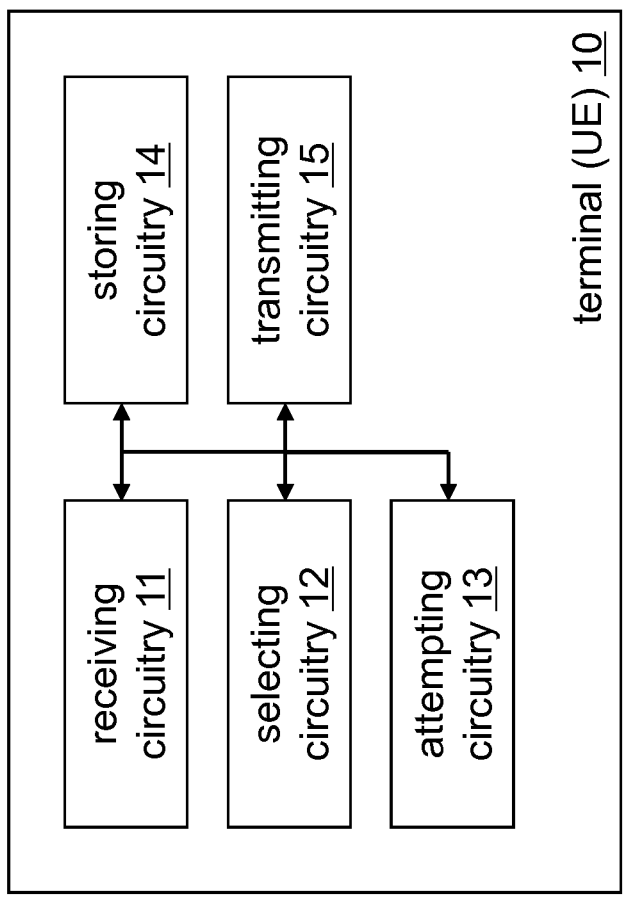
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) feedback on network-assisted fallback to contention-based random access.

According to 3GPP technical specification (TS) 36.331, a UE can provide some feedback about RACH attempts in RACH-Report as shown below:

```
UEInformationResponse-r9-IEs :: = SEQUENCE {
  rach-Report-r9           SEQUENCE {
    numberOfPreamblesSent-r9      NumberOfPreamblesSent-r11,
    contentionDetected-r9         BOOLEAN
  }                        OPTIONAL,
  rlf-Report-r9            RLF-Report-r9         OPTIONAL,
  nonCriticalExtension                UEInformationResponse-v930-IEs
  OPTIONAL
}
```

The information element (IE) "numberOfPreambleSent-r9" indicates the number of preamble transmission that the UE has performed during RACH attempt, and the IE "contentionDetected-r9" indicates whether the UE has detected a contention during random access.

This RACH report does not provide details of unsuccessful attempts and cannot be used to optimize the CBRA fallback assistance information.

In general terms, according to exemplary embodiments of the present invention, the RACH report is extended with information on the usage of fallback contention-based RA resources.

Here, it is noted that the information are not necessarily transported via the RACH report. Contrary thereto, according to exemplary embodiments of the present invention, these may be transported separate from the RACH report.

According to exemplary embodiments of the present invention, during the Random-Access procedure, the UE stores a list of unsuccessful random-access attempts, i.e., random-access preambles for which no RAR is received. For each entry, the UE stores the Random-Access Resource (preamble and time/frequency for RACH occasion), the associated pool ID, currently connected network slices, the network slices that it was connected to when sending measurement report triggering the handover or just before the reception of the handover command, the transmission power used to send the preamble, RA-RNTI, if it was CBRA or CFRA, or a subset thereof. The sent preambles may be stored in order of their transmission.

Once the UE performs a successful random-access procedure with the target cell, the UE transmits the stored list of random-access attempts to the target cell in the form of an enhanced RACH Report.

If the UE fails in random-access procedure to the target cell, the UE stores the list of random-access attempts and reports it to the next cell it can connect to (recovery cell). In such case, the recovery cell forwards the list to the original target cell to which the failed random-access attempts were made.

The target cell may use the information from the (enhanced) RACH report to optimize its allocation of random-access resource pools and definition of assistance information for UEs connected to different slices.

Exemplary embodiments of the present invention are explained in more specific terms referring to FIGS. 1 to 7.

Figure 5:
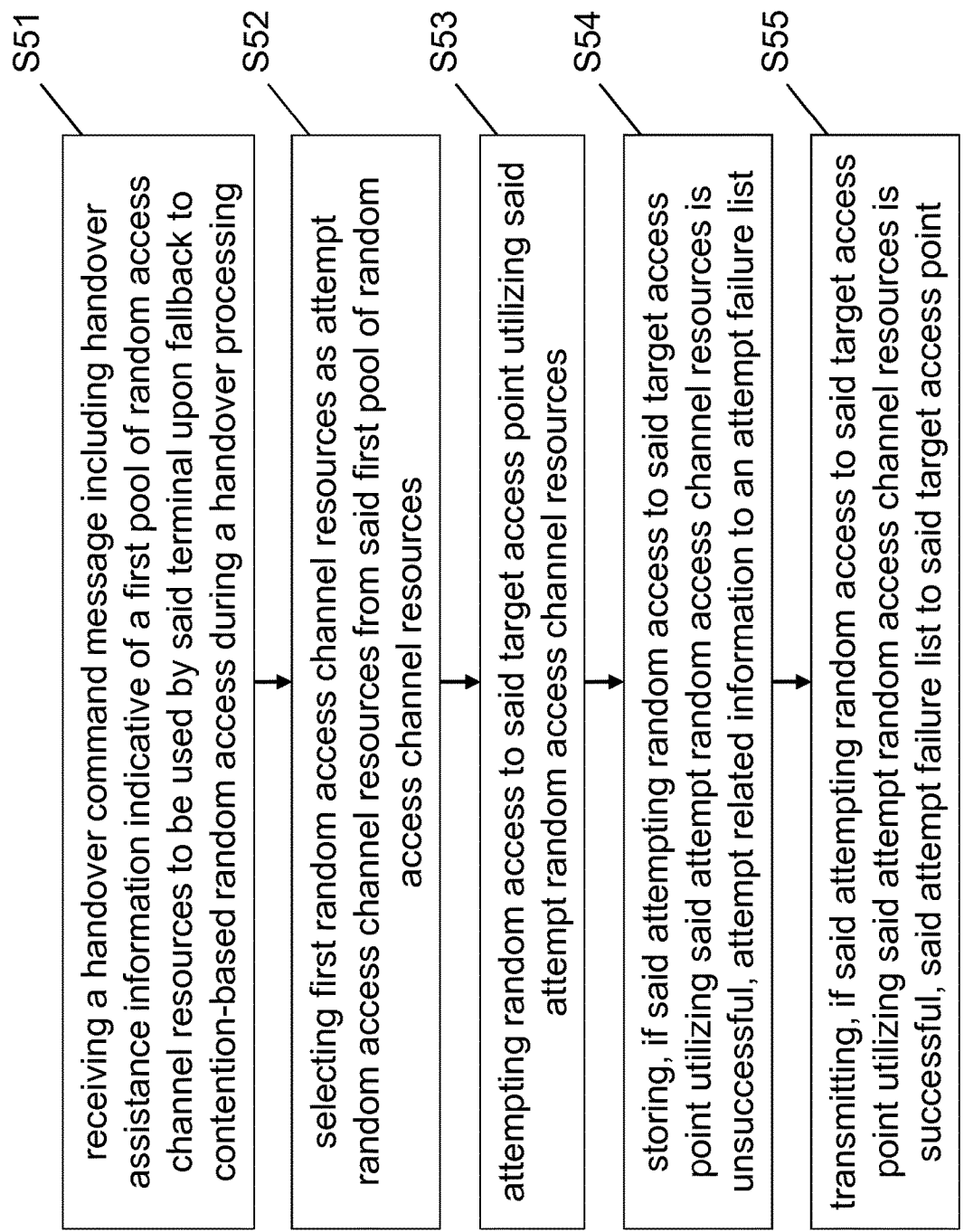
FIG. 5 is a schematic diagram of a procedure according to exemplary embodiments of the present invention.

FIG. 1 is a block diagram illustrating an apparatus according to exemplary embodiments of the present invention. The apparatus may be a terminal 10 (connected to at least one network slice and being subject to a handover from a source access point to a target access point) such as a user equipment comprising a receiving circuitry 11, a selecting circuitry 12, an attempting circuitry 13, a storing circuitry 14, and a transmitting circuitry 15. The receiving circuitry 11 receives a handover command message including handover assistance information indicative of a first pool of random access channel resources to be used by said terminal upon fallback to contention-based random access during a handover processing. The selecting circuitry 12 selects first random access channel resources as attempt random access channel resources from said first pool of random access channel resources. The attempting circuitry 13 attempts random access to said target access point utilizing said attempt random access channel resources. The storing circuitry 14 stores, if said attempting random access to said target access point utilizing said attempt random access channel resources is unsuccessful, attempt related information to an attempt failure list. The transmitting circuitry 15 transmits, if said attempting random access to said target access point utilizing said attempt random access channel resources is successful, said attempt failure list to said target access point. FIG. 5 is a schematic diagram of a procedure according to exemplary embodiments of the present invention. The apparatus according to FIG. 1 may perform the method of FIG. 5 but is not limited to this method. The method of FIG. 5 may be performed by the apparatus of FIG. 1 but is not limited to being performed by this apparatus.

As shown in FIG. 5, a procedure according to exemplary embodiments of the present invention comprises an operation of receiving (S51) a handover command message including handover assistance information indicative of a first pool of random access channel resources to be used by said terminal upon fallback to contention-based random access during a handover processing, an operation of selecting (S52) first random access channel resources as attempt random access channel resources from said first pool of random access channel resources, an operation of attempting (S53) random access to said target access point utilizing said attempt random access channel resources, an operation of storing (S54), if said attempting random access to said target access point utilizing said attempt random access channel resources is unsuccessful, attempt related information to an attempt failure list, and an operation of transmitting (S55), if said attempting random access to said target access point utilizing said attempt random access channel resources is successful, said attempt failure list to said target access point.

Figure 2:
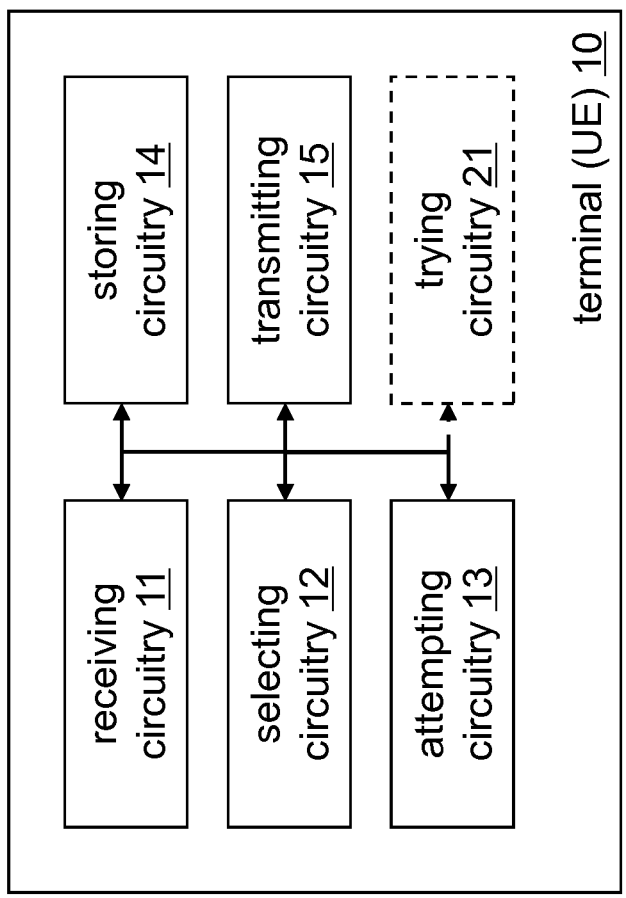
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise a trying circuitry 21.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to a variation of the procedure shown in FIG. 5, exemplary additional operations are given, which are inherently independent from each other as such. According to such variation, an exemplary method according to exemplary embodiments of the present invention may comprise an operation of selecting, if said attempting random access to said target access point utilizing said attempt random access channel resources is unsuccessful, second random access channel resources as said attempt random access channel resources from said first pool of random access channel resources.

According to a variation of the procedure shown in FIG. 5, exemplary additional operations are given, which are inherently independent from each other as such. According to such variation, an exemplary method according to exemplary embodiments of the present invention may comprise an operation of trying, if a failure condition with respect to said attempting random access to said target access point is met, to connect to a recovery access point, and an operation of transmitting, if said trying to connect to said recovery access point is successful, said attempt failure list to said recovery access point.

According to further exemplary embodiments of the present invention, said attempt related information comprises at least one of said attempt random access channel resources,
a pool identity associated with said first pool of random access channel resources,
information on said at least one network slice,
information on network slices said terminal was connected to when sending a measurement report triggering said handover,
information on network slices said terminal was connected to before receiving said handover command,
information on a transmit power with which a random access channel preamble associated with said attempt random access channel resources is sent for said attempting random access to said target access point utilizing said attempt random access channel resources,
a random access radio network temporary identifier of said attempt random access channel resources,
whether said attempting random access to said target access point utilizing said attempt random access channel resources utilized a contention-based random access procedure or a contention-free random access procedure, and
a time of said attempting random access to said target access point utilizing said attempt random access channel resources.

According to further exemplary embodiments of the present invention, said attempt failure list is transmitted with a random access channel report.

The handover processing may be a conditional handover processing.

Figure 3:
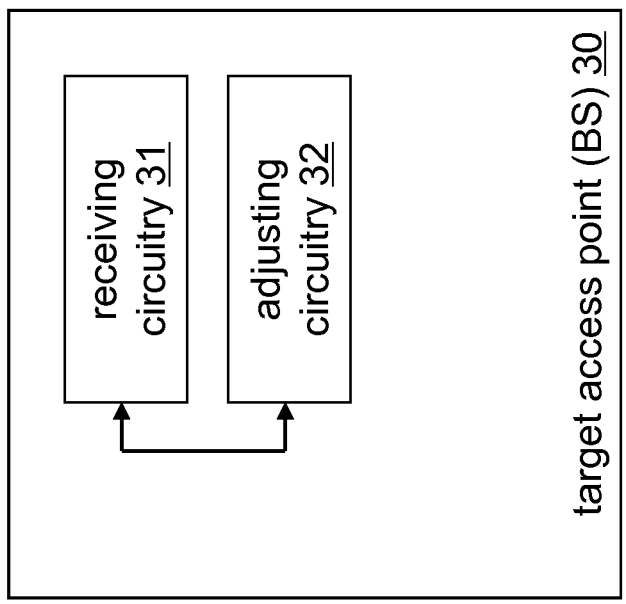
FIG. 3 is a block diagram illustrating an apparatus according to exemplary embodiments of the present invention.
Figure 6:
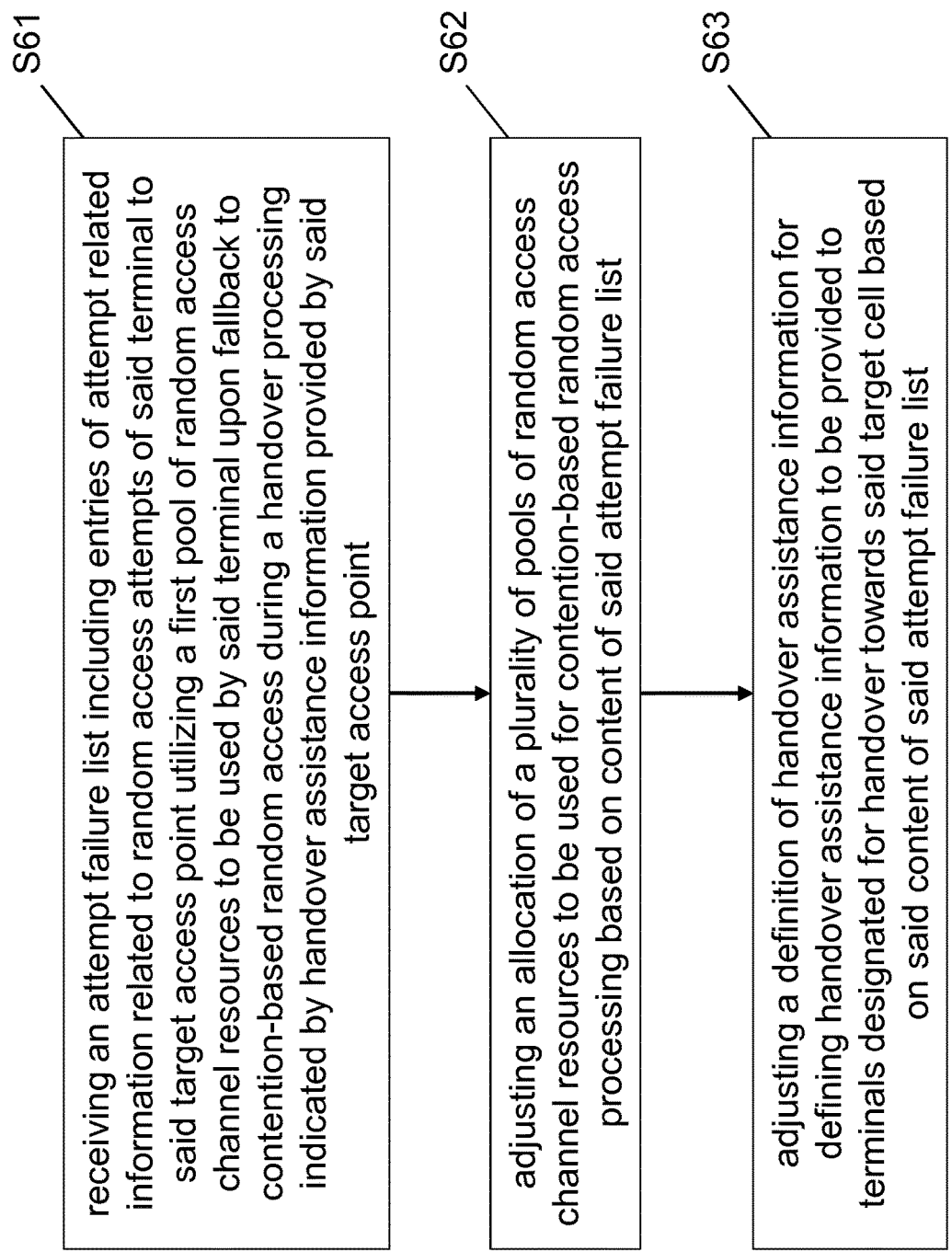
FIG. 6 is a schematic diagram of a procedure according to exemplary embodiments of the present invention.

FIG. 3 is a block diagram illustrating an apparatus according to exemplary embodiments of the present invention. The apparatus may be a target access point 30 (being a target of a handover of a terminal connected to at least one network slice from a source access point) such as a base station comprising a receiving circuitry 31 and an adjusting circuitry 32. The receiving circuitry 21 receives an attempt failure list including entries of attempt related information related to random access attempts of said terminal to said target access point utilizing a first pool of random access channel resources to be used by said terminal upon fallback to contention-based random access during a handover processing indicated by handover assistance information provided by said target access point. The adjusting circuitry 32 adjusts an allocation of a plurality of pools of random access channel resources to be used for contention-based random access processing based on content of said attempt failure list. The adjusting circuitry 32 (or a second adjusting circuitry) adjusts a definition of handover assistance information for defining handover assistance information to be provided to terminals designated for handover towards said target cell based on said content of said attempt failure list. FIG. 6 is a schematic diagram of a procedure according to exemplary embodiments of the present invention. The apparatus according to FIG. 3 may perform the method of FIG. 6 but is not limited to this method. The method of FIG. 6 may be performed by the apparatus of FIG. 3 but is not limited to being performed by this apparatus.

As shown in FIG. 6, a procedure according to exemplary embodiments of the present invention comprises an operation of receiving (S61) an attempt failure list including entries of attempt related information related to random access attempts of said terminal to said target access point utilizing a first pool of random access channel resources to be used by said terminal upon fallback to contention-based random access during a handover processing indicated by handover assistance information provided by said target access point, an operation of adjusting (S62) an allocation of a plurality of pools of random access channel resources to be used for contention-based random access processing based on content of said attempt failure list, and an operation of adjusting (S63) a definition of handover assistance information for defining handover assistance information to be provided to terminals designated for handover towards said target cell based on said content of said attempt failure list.

In an embodiment at least some of the functionalities of the apparatus shown in FIG. 3 may be shared between two physically separate devices forming one operational entity. Therefore, the apparatus may be seen to depict the operational entity comprising one or more physically separate devices for executing at least some of the described processes.

According to further exemplary embodiments of the present invention, said attempt failure list is received from said terminal.

According to further exemplary embodiments of the present invention, said attempt failure list is received from a recovery access point to which said terminal connected to upon a failure condition with respect to said random access attempts to said target access point being met.

According to further exemplary embodiments of the present invention, said attempt related information comprises at least one of
attempt random access channel resources selected from said first pool of random access channel resources for a respective random access attempt of said terminal to said target access point,
a pool identity associated with said first pool of random access channel resources,
information on said at least one network slice,
information on network slices said terminal was connected to when sending a measurement report triggering said handover,
information on network slices said terminal was connected to before receiving a handover command including said handover assistance information,
information on a transmit power with which a random access channel preamble associated with said attempt random access channel resources is sent for said respective random access attempt of said terminal to said target access point utilizing said attempt random access channel resources,
a random access radio network temporary identifier of said attempt random access channel resources,
whether said respective random access attempt of said terminal to said target access point utilizing said attempt random access channel resources utilized a contention-based random access procedure or a contention-free random access procedure, and
a time of said respective random access attempt of said terminal to said target access point utilizing said attempt random access channel resources.

According to further exemplary embodiments of the present invention, said attempt failure list is received with a random access channel report.

The handover processing may be a conditional handover processing.

Figure 4:
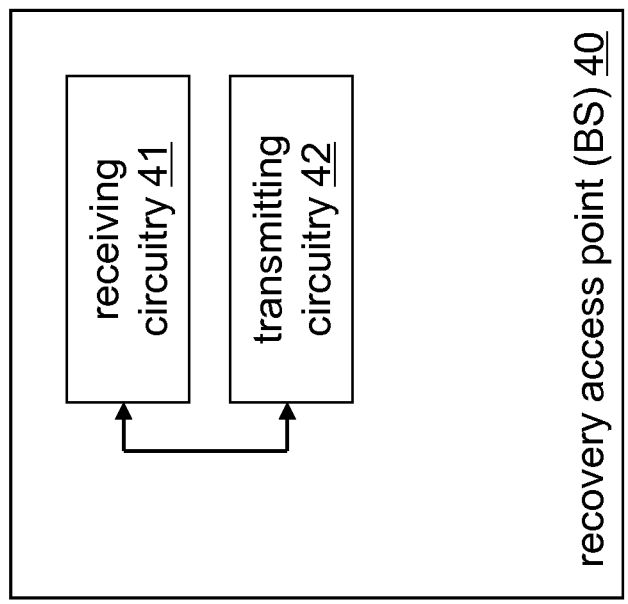
FIG. 4 is a block diagram illustrating an apparatus according to exemplary embodiments of the present invention.
Figure 7:
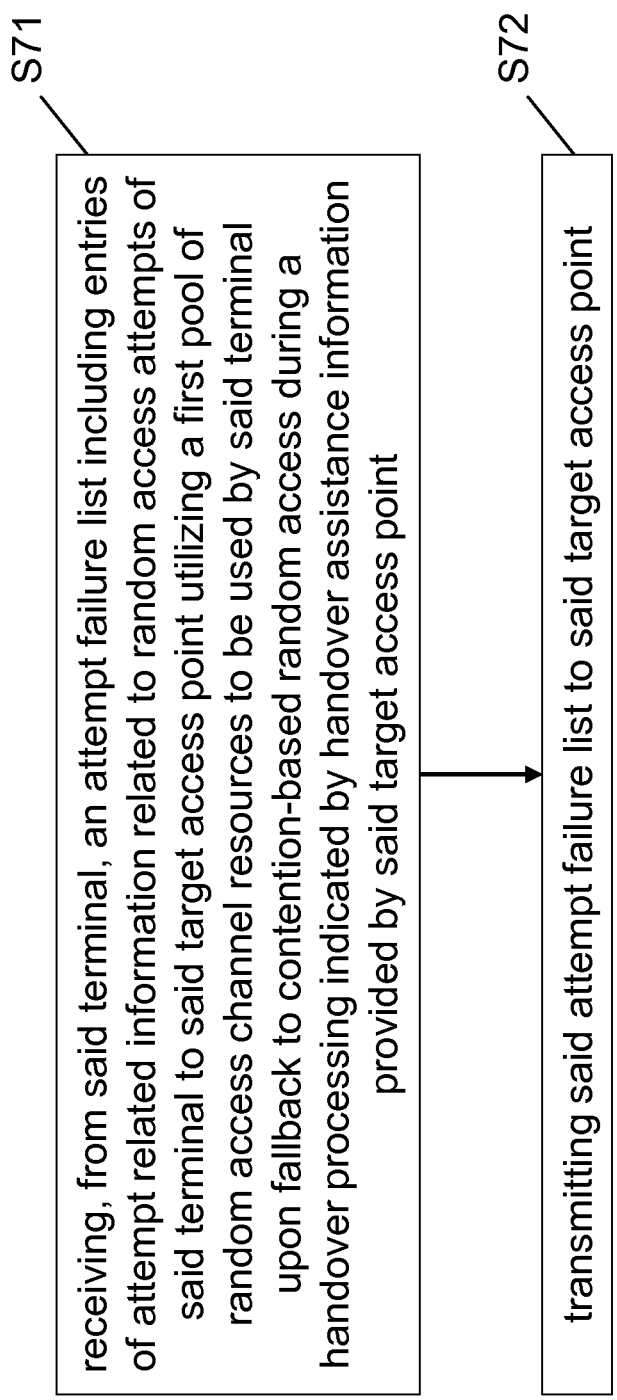
FIG. 7 is a schematic diagram of a procedure according to exemplary embodiments of the present invention.
Figure 8:
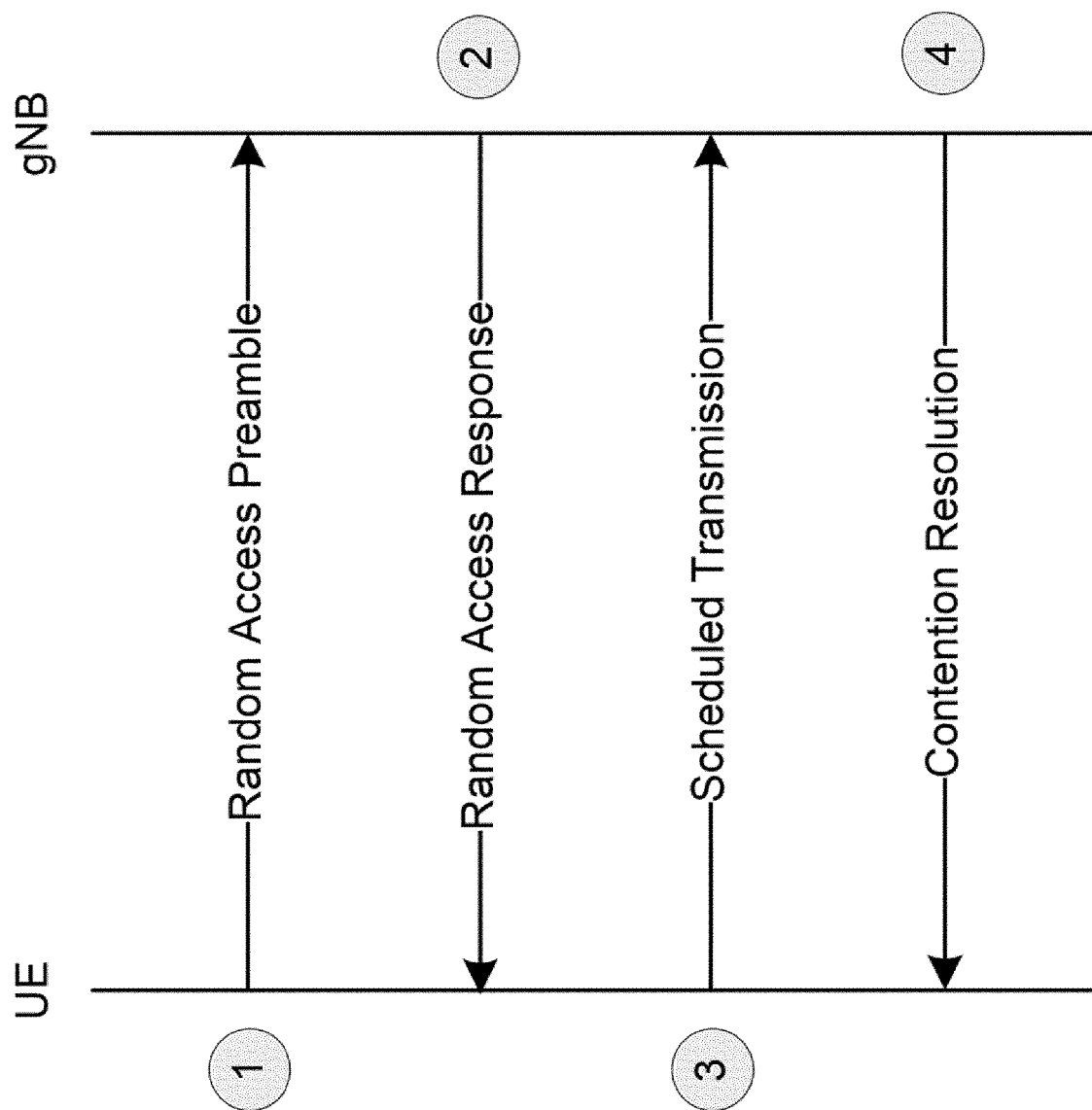
FIG. 8 shows a schematic diagram of an exemplary system environment with signaling variants of a random-access procedure.
Figure 9:
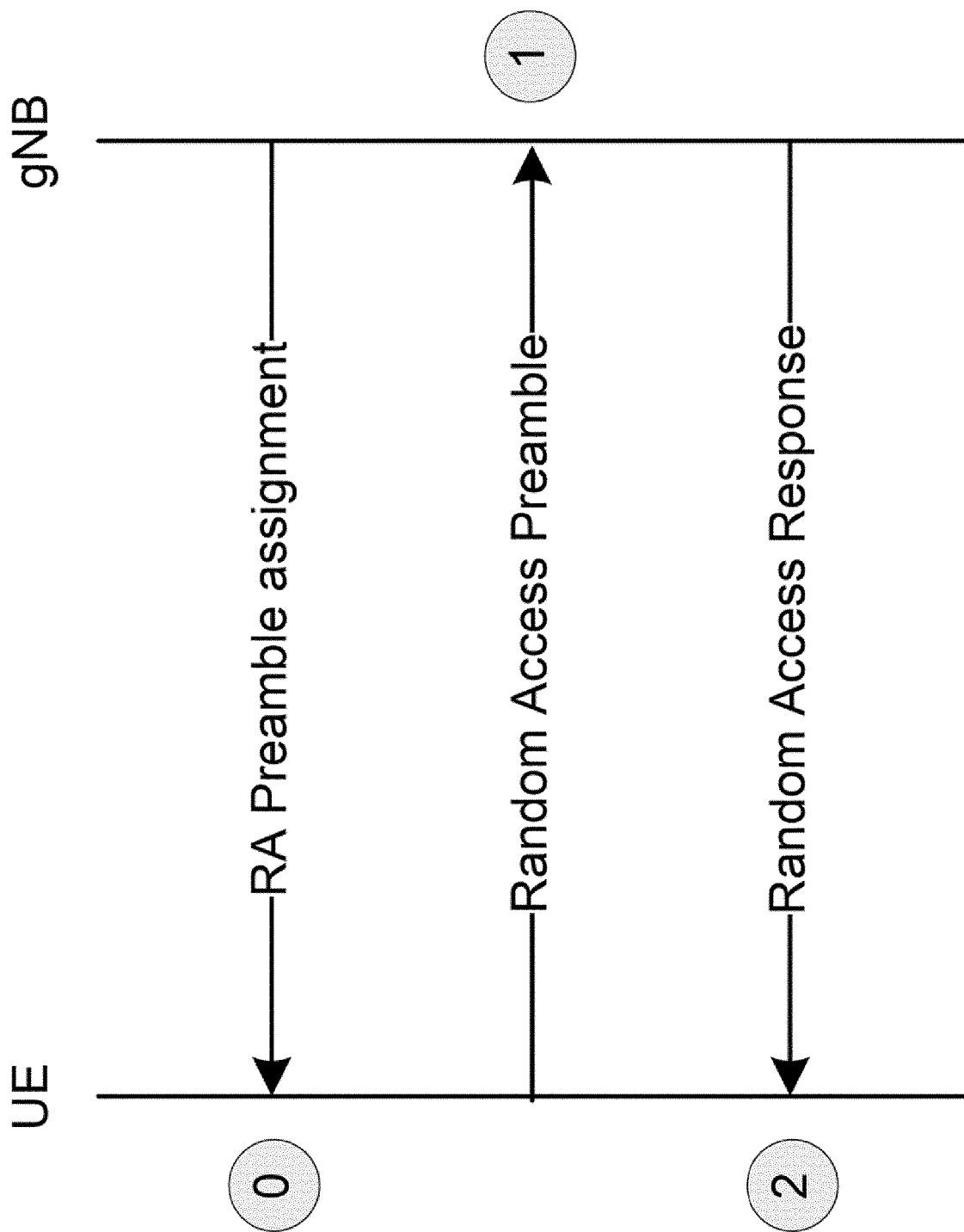
FIG. 9 shows a schematic diagram of an exemplary system environment with signaling variants of a random-access procedure.
Figure 10:
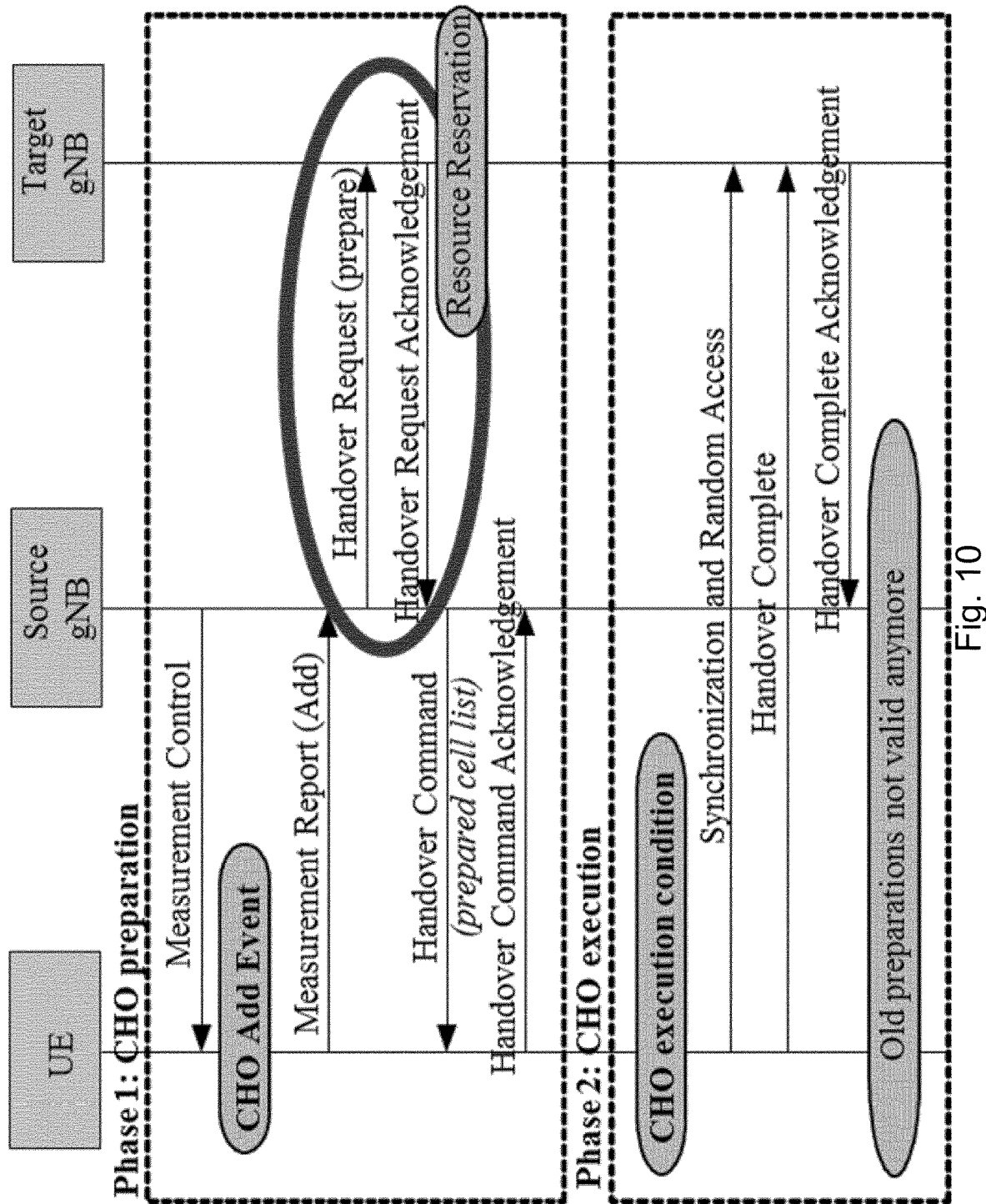
FIG. 10 shows a schematic diagram of an exemplary system environment with signaling variants of a conditional handover procedure.
Figure 11:
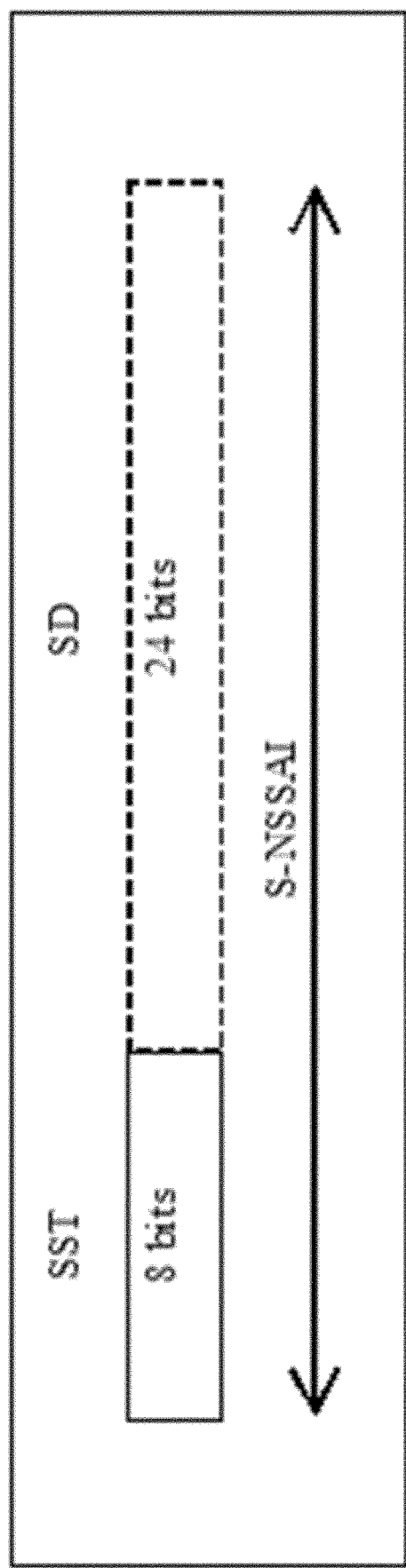
FIG. 11 is a schematic diagram illustrating a structure of an identification information element.
Figure 12:
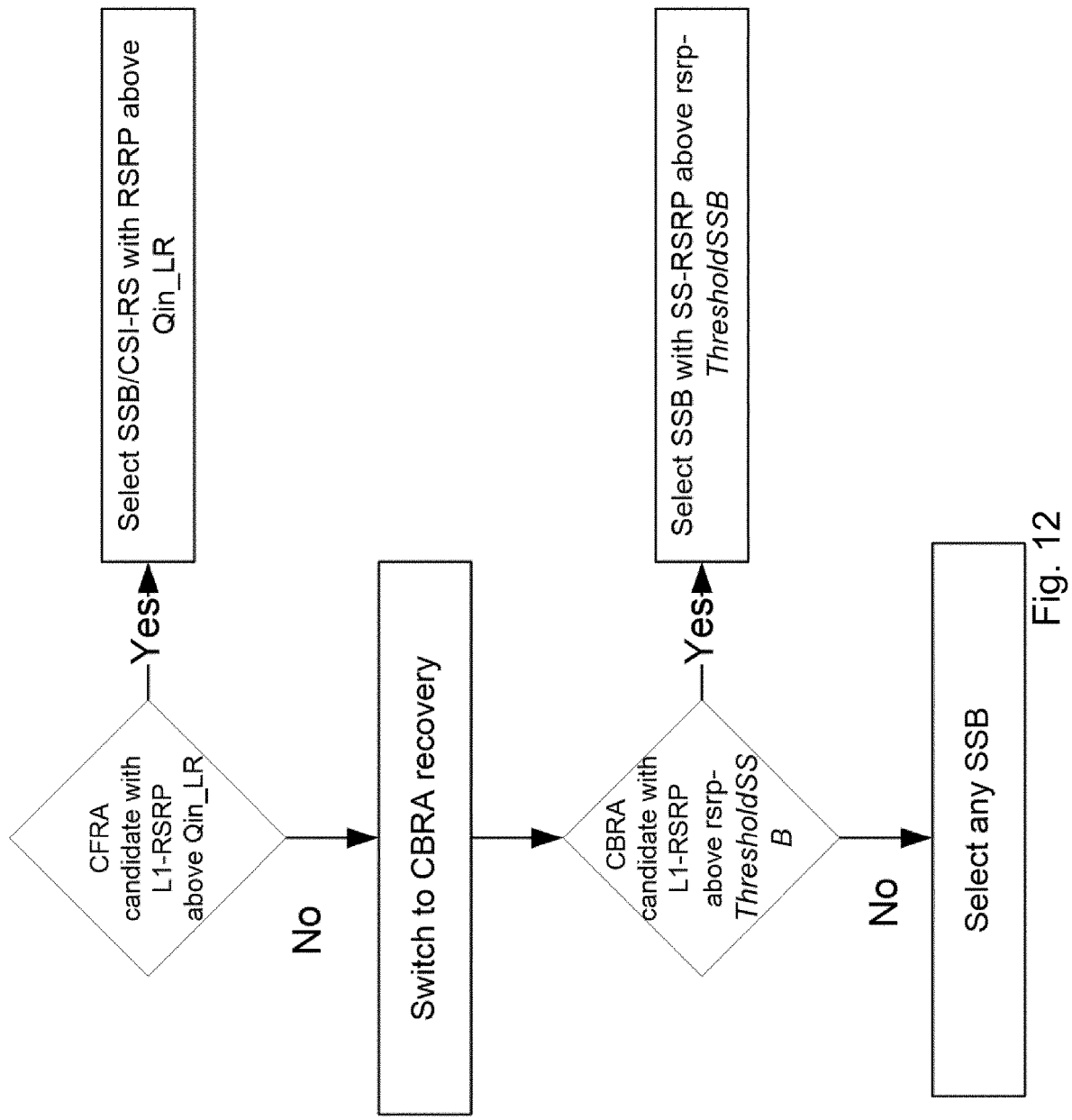
FIG. 12 is a schematic diagram of a random-access procedure implementing contention-free random access and contention-based random access.

FIG. 4 is a block diagram illustrating an apparatus according to exemplary embodiments of the present invention. The apparatus may be a recovery access point 40 (to which a terminal connected to at least one network slice and being subject to a handover from a source access point to a target access point is connected to upon a failure condition with respect to random access attempts to said target access point being met) such as a base station comprising a receiving circuitry 41 and a transmitting circuitry 42. The receiving circuitry 41 receives, from said terminal, an attempt failure list including entries of attempt related information related to random access attempts of said terminal to said target access point utilizing a first pool of random access channel resources to be used by said terminal upon fallback to contention-based random access during a handover processing indicated by handover assistance information provided by said target access point. The transmitting circuitry 42 transmits said attempt failure list to said target access point. FIG. 7 is a schematic diagram of a procedure according to exemplary embodiments of the present invention. The apparatus according to FIG. 4 may perform the method of FIG. 7 but is not limited to this method. The method of FIG. 7 may be performed by the apparatus of FIG. 4 but is not limited to being performed by this apparatus.

As shown in FIG. 7, a procedure according to exemplary embodiments of the present invention comprises an operation of receiving (S71), from said terminal, an attempt failure list including entries of attempt related information related to random access attempts of said terminal to said target access point utilizing a first pool of random access channel resources to be used by said terminal upon fallback to contention-based random access during a handover processing indicated by handover assistance information provided by said target access point, and an operation of transmitting (S72) said attempt failure list to said target access point.

In an embodiment at least some of the functionalities of the apparatus shown in FIG. 4 may be shared between two physically separate devices forming one operational entity. Therefore, the apparatus may be seen to depict the operational entity comprising one or more physically separate devices for executing at least some of the described processes.

According to further exemplary embodiments of the present invention, said attempt related information comprises at least one of attempt random access channel resources selected from said first pool of random access channel resources for a respective random access attempt of said terminal to said target access point, a pool identity associated with said first pool of random access channel resources, information on said at least one network slice, information on network slices said terminal was connected to when sending a measurement report triggering said handover, information on network slices said terminal was connected to before receiving a handover command including said handover assistance information, information on a transmit power with which a random access channel preamble associated with said attempt random access channel resources is sent for said respective random access attempt of said terminal to said target access point utilizing said attempt random access channel resources, a random access radio network temporary identifier of said attempt random access channel resources, whether said respective random access attempt of said terminal to said target access point utilizing said attempt random access channel resources utilized a contention-based random access procedure or a contention-free random access procedure, and a time of said respective random access attempt of said terminal to said target access point utilizing said attempt random access channel resources.

According to further exemplary embodiments of the present invention, said attempt failure list is received with a random access channel report.

According to further exemplary embodiments of the present invention, alternatively or in addition, said attempt failure list is transmitted with a random access channel report.

The handover processing may be a conditional handover processing.

Figure 13:
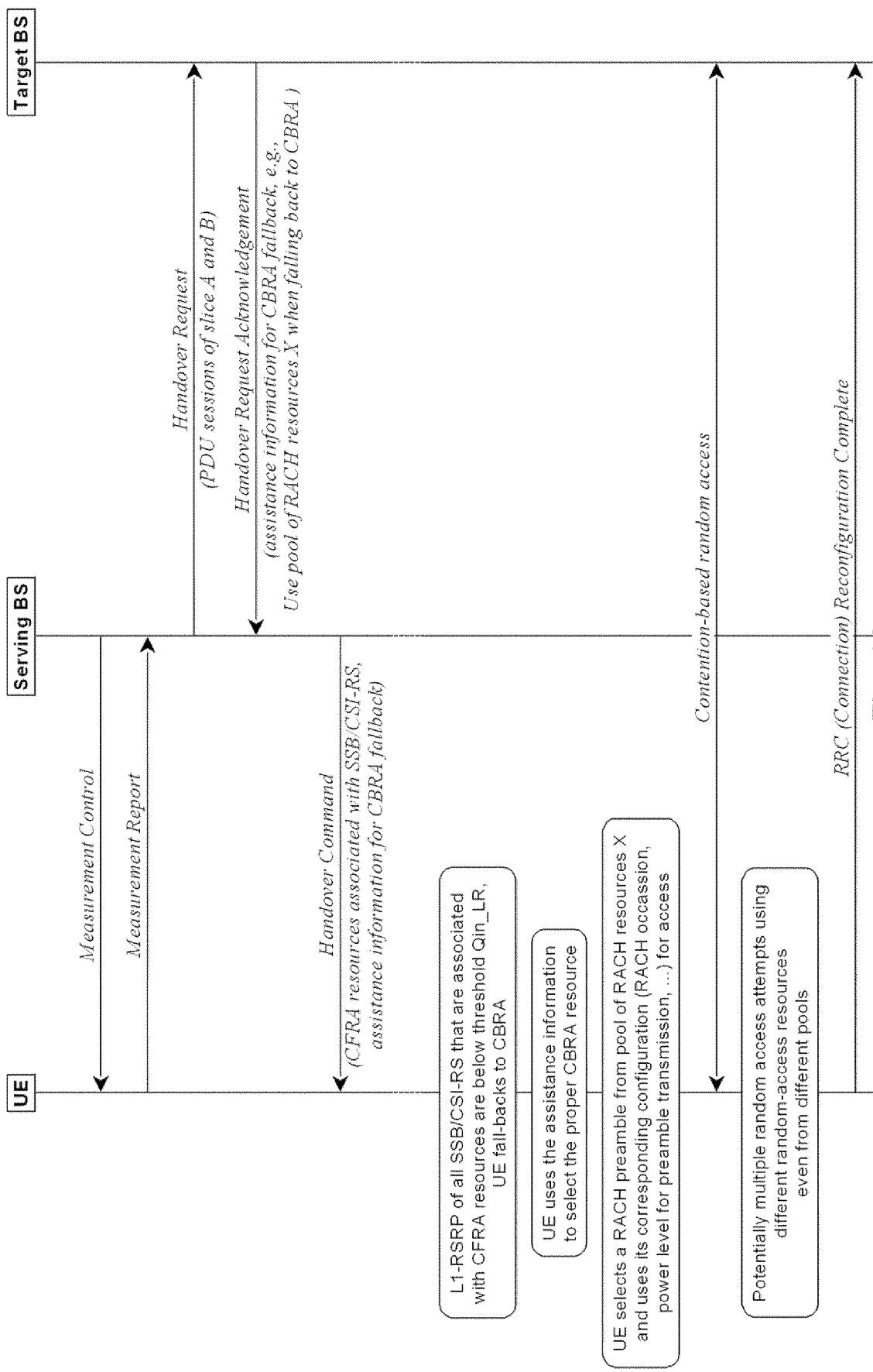
FIG. 13 shows a schematic diagram of an example of a system environment with signaling variants according to exemplary embodiments of the present invention.
Figure 14:
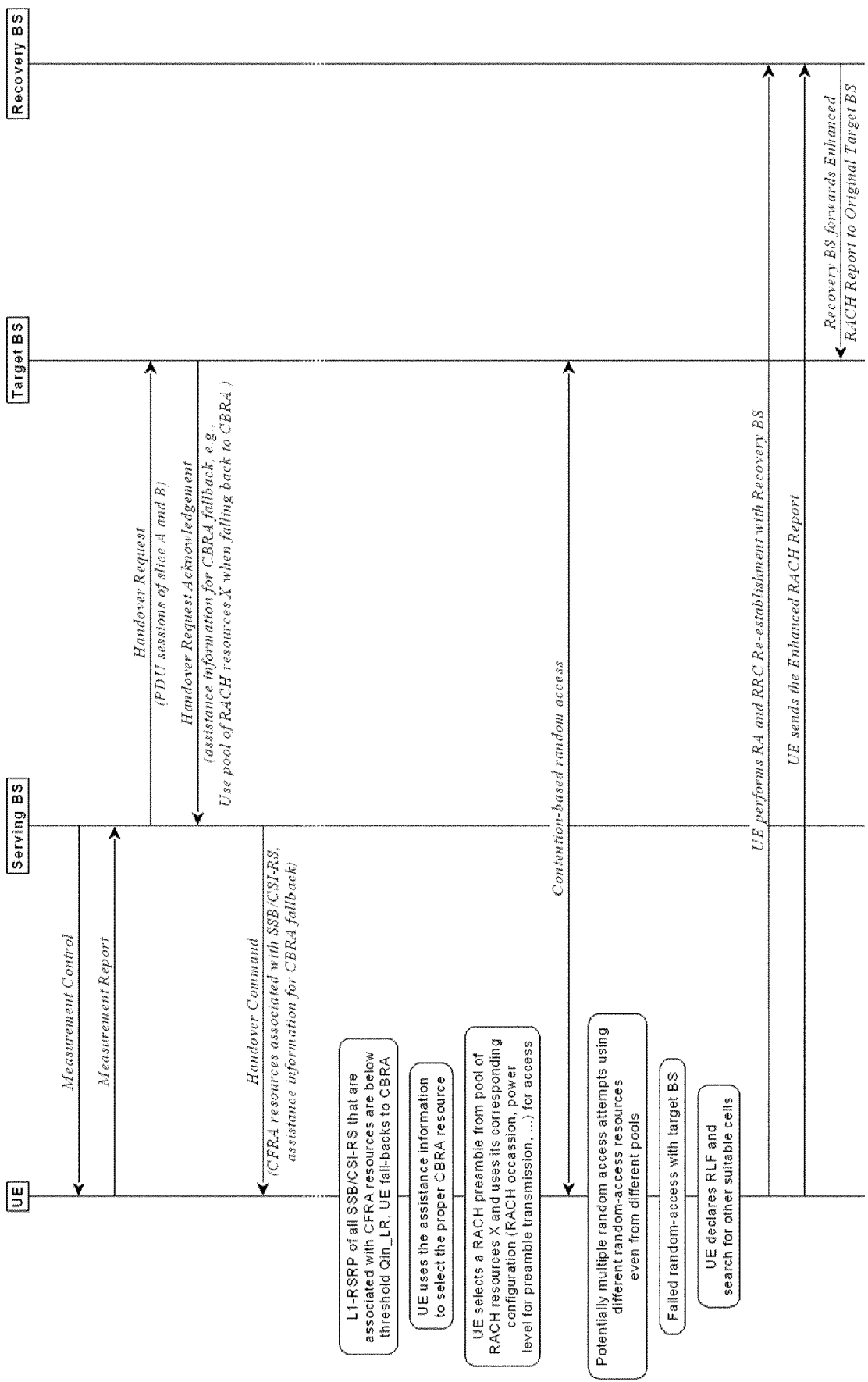
FIG. 14 shows a schematic diagram of an example of a system environment with signaling variants according to exemplary embodiments of the present invention.
Figure 15:
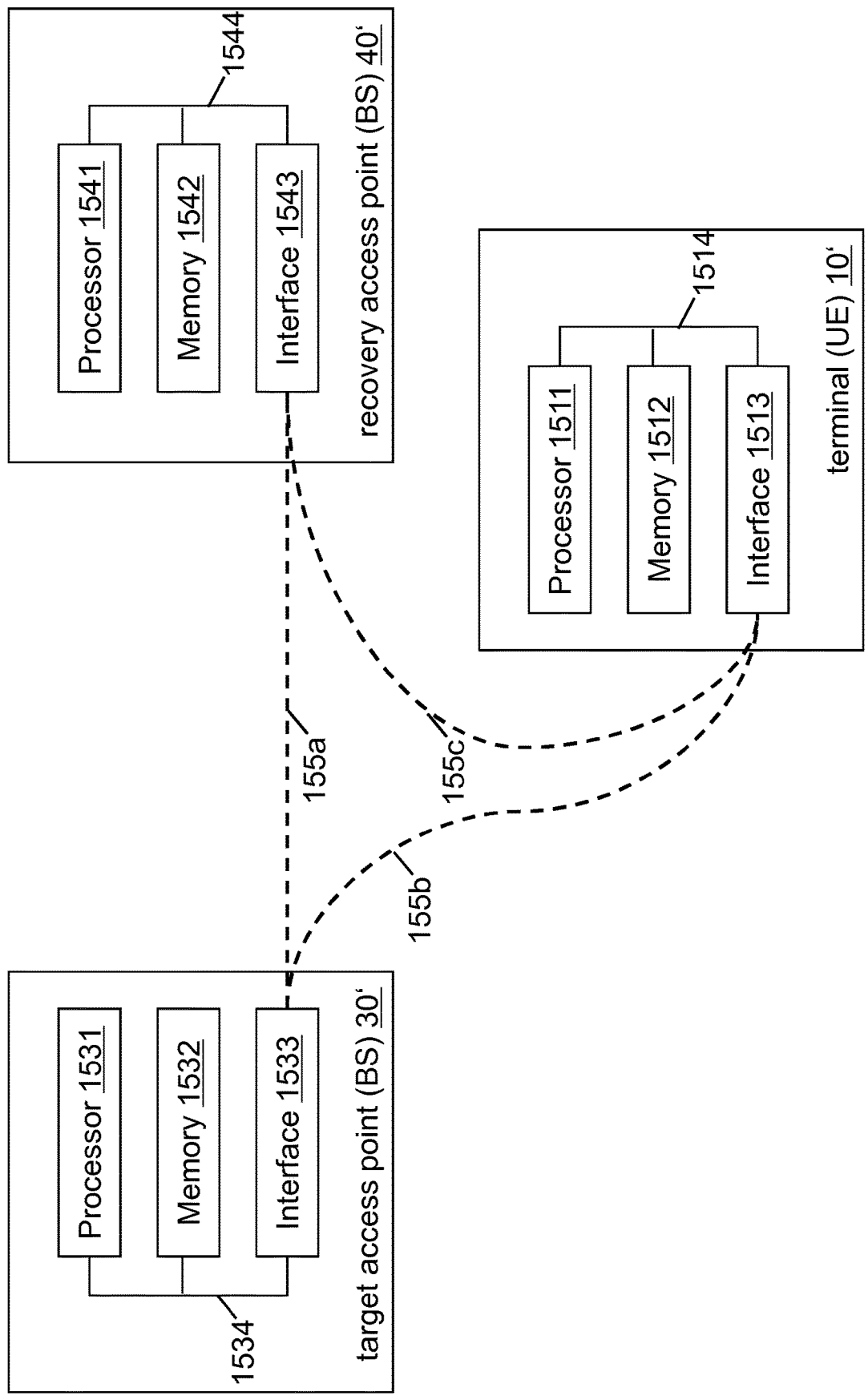
FIG. 15 is a block diagram alternatively illustrating apparatuses according to exemplary embodiments of the present invention.

FIGS. 13 to 15 illustrate exemplary embodiments of the present invention in more detail.

FIG. 13 shows a schematic diagram of an example of a system environment with signaling variants according to exemplary embodiments of the present invention. In particular, FIG. 13 illustrates handling a case of a successful random-access to a target cell.

As is derivable from FIG. 13, according to exemplary embodiments of the present invention, during HO preparation, the target cell provides the assistance information about which resource pool to be used in case of different combination of simultaneously connected network slices at the time of HO execution.

In case the UE has to fallback to CBRA resources during HO execution, the UE selects the random-access resources according to the assistance information provided by the target cell.

For each random-access attempt, the UE stores a list of related information like the Random-Access Resource, the pool ID, currently connected network slices, the network slices that it was connected to when sending measurement report triggering the handover or just before the reception of the handover command, the transmission power used to send preamble, RA-RNTI, if it was CBRA or CFRA, or a subset thereof.

An exemplary list is shown in the following table.

| Preamble number | RA pool in Assistance information | Used RA resource | Active PDU Session/Slices at RA attempt | Active PDU Sessions/Slices at HO Request | Power | Time | CFRA or CBRA |
| --- | --- | --- | --- | --- | --- | --- | --- |
| 1 | | | | | | | |
| 2 | | | | | | | |
| ... | | | | | | | |

FIG. 14 shows a schematic diagram of an example of a system environment with signaling variants according to exemplary embodiments of the present invention. In particular, FIG. 14 illustrates handling a case of a failed random-access to a target cell and a subsequent connection to a recovery cell.

As is derivable from FIG. 14, according to exemplary embodiments of the present invention, if the UE is unable to perform a successful random-access to the "original" target cell, the UE searches for another suitable cell (Recovery Cell) in the network.

Once the UE is able to successfully connect to such Recovery Cell, the UE sends the list of previous random-access attempts in the Enhanced RACH Report to the Recovery Cell. The Recovery Cell then forwards the report to the "original" Target Cell.

In either of the cases illustrated in FIGS. 13 and 14, according to exemplary embodiments of the present invention, finally, the target cell can analyze the Enhanced RACH Reports, either directly received from the UE or from the Recovery Cells. The analysis can focus on, for example, changes in the connected slices of UE between HO preparation and HO execution, random-access resources selected the UE from given pools, successful/unsuccessful attempts using resources of different pools, etc.

Based on the analysis, the target cell can optimize its allocation of random-access resources to different pools as well as selection of specific pools in assistance information when the UE is connected to multiple slices simultaneously.

According to exemplary embodiments of the present invention, advantageously, a target cell gets an overview of what resources were actually used by the UE out of the provided set of pool of random-access resources during unsuccessful RACH attempts or successful attempts with preamble re-transmissions (i.e. when random access does not succeed from the first attempt).

Consequently, the target cell can optimize the fallback RACH resources in relation to the network slice/PDU session sets of UEs.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

In FIG. 15, an alternative illustration of apparatuses according to exemplary embodiments of the present invention is depicted. As indicated in FIG. 15, according to exemplary embodiments of the present invention, the apparatus (terminal) 10' (corresponding to the terminal 10) comprises a processor 1511, a memory 1512 and an interface 1513, which are connected by a bus 1514 or the like. Further, according to exemplary embodiments of the present invention, the apparatus (target access point) 30' (corresponding to the target access point 30) comprises a processor 1531, a memory 1532 and an interface 1533, which are connected by a bus 1534 or the like. Further, according to exemplary embodiments of the present invention, the apparatus (recovery access point) 40' (corresponding to the recovery access point 40) comprises a processor 1541, a memory 1542 and an interface 1543, which are connected by a bus 1544 or the like. The apparatuses may be connected via links 155a, 155b, and 155c, respectively.

The processor 1511/1531/1541 and/or the interface 1513/1533/1543 may also include a modem or the like to facilitate communication over a (hardwire or wireless) link, respectively. The interface 1513/1533/1543 may include a suitable transceiver coupled to one or more antennas or communication means for (hardwire or wireless) communications with the linked or connected device(s), respectively. The interface 1513/1533/1543 is generally configured to communicate with at least one other apparatus, i.e. the interface thereof.

The memory 1512/1532/1542 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the terminal 10 (connected to at least one network slice and being subject to a handover from a source access point to a target access point) comprises at least one processor 1511, at least one memory 1512 including computer program code, and at least one interface 1513 configured for communication with at least another apparatus. The processor (i.e. the at least one processor 1511, with the at least one memory 1512 and the computer program code) is configured to perform receiving a handover command message including handover assistance information indicative of a first pool of random access channel resources to be used by said terminal upon fallback to contention-based random access during a handover processing (thus the apparatus comprising corresponding means for receiving), to perform selecting first random access channel resources as attempt random access channel resources from said first pool of random access channel resources (thus the apparatus comprising corresponding means for selecting), to perform attempting random access to said target access point utilizing said attempt random access channel resources (thus the apparatus comprising corresponding means for attempting), to perform storing, if said attempting random access to said target access point utilizing said attempt random access channel resources is unsuccessful, attempt related information to an attempt failure list (thus the apparatus comprising corresponding means for storing), and to perform transmitting, if said attempting random access to said target access point utilizing said attempt random access channel resources is successful, said attempt failure list to said target access point (thus the apparatus comprising corresponding means for transmitting).

According to exemplary embodiments of the present invention, an apparatus representing the target access point 30 (being a target of a handover of a terminal connected to at least one network slice from a source access point) comprises at least one processor 1531, at least one memory 1532 including computer program code, and at least one interface 1533 configured for communication with at least another apparatus. The processor (i.e. the at least one processor 1531, with the at least one memory 1532 and the computer program code) is configured to perform receiving an attempt failure list including entries of attempt related information related to random access attempts of said terminal to said target access point utilizing a first pool of random access channel resources to be used by said terminal upon fallback to contention-based random access during a handover processing indicated by handover assistance information provided by said target access point (thus the apparatus comprising corresponding means for receiving), to perform adjusting an allocation of a plurality of pools of random access channel resources to be used for contention-based random access processing based on content of said attempt failure list (thus the apparatus comprising corresponding means for adjusting), and to perform adjusting a definition of handover assistance information for defining handover assistance information to be provided to terminals designated for handover towards said target cell based on said content of said attempt failure list.

According to exemplary embodiments of the present invention, an apparatus representing the recovery access point 40 (to which a terminal connected to at least one network slice and being subject to a handover from a source access point to a target access point is connected to upon a failure condition with respect to random access attempts to said target access point being met) comprises at least one processor 1541, at least one memory 1542 including computer program code, and at least one interface 1543 configured for communication with at least another apparatus. The processor (i.e. the at least one processor 1541, with the at least one memory 1542 and the computer program code) is configured to perform receiving, from said terminal, an attempt failure list including entries of attempt related information related to random access attempts of said terminal to said target access point utilizing a first pool of random access channel resources to be used by said terminal upon fallback to contention-based random access during a handover processing indicated by handover assistance information provided by said target access point (thus the apparatus comprising corresponding means for receiving), and to perform transmitting said attempt failure list to said target access point (thus the apparatus comprising corresponding means for transmitting).

For further details regarding the operability/functionality of the individual apparatuses, reference is made to the above description in connection with any one of FIGS. 1 to 14, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product)

embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for feedback on network-assisted fallback to contention-based random access. Such measures exemplarily comprise, at a terminal connected to at least one network slice and being subject to a handover from a source access point to a target access point, receiving a handover command message including handover assistance information indicative of a first pool of random access channel resources to be used by said terminal upon fallback to contention-based random access during a handover processing, selecting first random access channel resources as attempt random access channel resources from said first pool of random access channel resources, attempting random access to said target access point utilizing said attempt random access channel resources, storing, if said attempting random access to said target access point utilizing said attempt random access channel resources is unsuccessful, attempt related information to an attempt failure list, and transmitting, if said attempting random access to said target access point utilizing said attempt random access channel resources is successful, said attempt failure list to said target access point.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
CBRA Contention-Based Random Access
CFRA Contention-Free Random Access
CHO conditional handover
CSI-RS channel state information reference signal
C-RNTI Cell-Radio Network Temporary Identifier
DL downlink
eMBB enhanced Mobile Broadband
HO Handover
IE information element
MAC Medium Access Control
NR New Radio
PDU protocol data unit
PUCCH Physical Uplink Control Channel
RACH Random-Access Channel
RAR Random-Access Response
RRC radio resource control
RSRP Reference Signal Received Strength
SCell Secondary Cell
SD Slice Differentiator
SI System Information
SR Scheduling Request
SSB synchronization signal block
SST Slice Service Type
S-NSSAI Single-Network Slice Selection Assistance Information TS Technical Specification
UE user equipment
UL uplink
URLLC Ultra-Reliable Low Latency Communication

The invention claimed is:

1. An apparatus of a terminal connected to at least one network slice and being subject to a handover from a source access point to a target access point, the apparatus comprising:
at least one processor; and
at least one memory including computer program code that, when executed by the processor, cause the at least one processor to perform the following operations:
receiving a first handover command message including first handover assistance information indicative of a first pool of random access channel resources to be used by the terminal upon fallback to contention-based random access during a first handover processing;
selecting first random access channel resources as first attempt random access channel resources from the first pool of random access channel resources;
attempting a first random access to the target access point utilizing the first attempt random access channel resources;
storing, when attempting the first random access to the target access point utilizing the first attempt random access channel resources is unsuccessful, attempt related information to an attempt failure list;
receiving a second handover command message including second handover assistance information indicative of a second pool of random access channel resources to be used by the terminal upon fallback to contention-based random access during a second handover processing;
selecting second random access channel resources as second attempt random access channel resources from the second pool of random access channel resources;
attempting a second random access to the target access point utilizing the second attempt random access channel resources;
transmitting, when attempting the second random access to the target access point utilizing the second attempt random access channel resources is successful, the attempt failure list to the target access point;
trying, when a failure condition with respect to attempting the second random access to the target access point is met, to connect to a recovery access point; and
transmitting, when the trying to connect to the recovery access point is successful, the attempt failure list to the recovery access point.

2. The apparatus according to claim 1, wherein the program code further cause the at least one processor to perform the following operation: selecting, when attempting the first random access to the target access point utilizing the first attempt random access channel resources is unsuccessful, the second random access channel resources as the first attempt random access channel resources from the first pool of random access channel resources.

3. The apparatus according to claim 1, wherein the attempt related information comprises the following: attempt random access channel resources, a pool identity associated with the first pool of random access channel resources, information on the at least one network slice, information on network slices the terminal was connected to when sending a measurement report triggering the handover, information on network slices the terminal was connected to before receiving the handover command, information on a transmit power with which a random access channel preamble associated with the first attempt random access channel resources is sent for attempting the first random access to the target access point utilizing the first attempt random access channel resources, a random access radio network temporary identifier of the first attempt random access channel resources, whether attempting the first random access to the target access point utilizing the first attempt random access channel resources utilized a contention-based random access procedure or a contention-free random access procedure, and a time of attempting the first random access to the target access point utilizing the first attempt random access channel resources.

4. The apparatus according to claim 1, wherein the attempt failure list is transmitted with a random access channel report.

5. The apparatus according to claim 1, wherein the handover processing is a conditional handover processing.

6. The apparatus according to claim 1, wherein the apparatus is a user equipment.

7. A system comprising:
an apparatus;
a processor; and
a non-transitory computer readable media comprising computer-executable instructions that, when executed by the processor, cause the processor to perform the following operations:
receiving a first handover command message including first handover assistance information indicative of a first pool of random access channel resources to be used by a terminal upon fallback to contention-based random access during a first handover processing;
selecting first random access channel resources as first attempt random access channel resources from the first pool of random access channel resources;
attempting a first random access to a target access point utilizing the first attempt random access channel resources;
storing, when attempting the first random access to the target access point utilizing attempt random access channel resources is unsuccessful, attempt related information to an attempt failure list;
receiving a second handover command message including second handover assistance information indicative of a second pool of random access channel resources to be used by the terminal upon fallback to contention-based random access during a second handover processing;
selecting second random access channel resources as second attempt random access channel resources from the second pool of random access channel resources;
attempting a second random access to the target access point utilizing the second attempt random access channel resources;
transmitting, when attempting the second random access to the target access point utilizing the second attempt random access channel resources is successful, the attempt failure list to the target access point;
trying, when a failure condition with respect to attempting the second random access to the target access point is met, to connect to a recovery access point; and transmitting, when the trying to connect to the recovery access point is successful, the attempt failure list to the recovery access point.

8. The system according to claim 7, wherein the computer-executable instructions further cause the at least one processor to perform the following operation: selecting, when attempting the first random access to the target access point utilizing the first attempt random access channel resources is unsuccessful, the second random access channel resources as the first attempt random access channel resources from the first pool of random access channel resources.

9. The system according to claim 7, wherein the attempt related information comprises the following: attempt random access channel resources, a pool identity associated with the first pool of random access channel resources, information on at least one network slice, information on network slices the terminal was connected to when sending a measurement report triggering the handover, information on network slices the terminal was connected to before receiving the handover command, information on a transmit power with which a random access channel preamble associated with the first attempt random access channel resources is sent for attempting the first random access to the target access point utilizing the first attempt random access channel resources, a random access radio network temporary identifier of the first attempt random access channel resources, whether attempting the first random access to the target access point utilizing the first attempt random access channel resources utilized a contention-based random access procedure or a contention-free random access procedure, and a time of attempting the first random access to the target access point utilizing the first attempt random access channel resources.

10. The system according to claim 7, wherein the attempt failure list is transmitted with a random access channel report.

11. The system according to claim 7, wherein the handover processing is a conditional handover processing.

12. The system according to claim 7, wherein the apparatus is a user equipment.

13. The system according to claim 7, wherein the apparatus is of a terminal connected to at least one network slice and being subject to a handover from a source access point to the target access point.

14. The system according to claim 13, wherein the target access point is base station.

15. A method comprising:
receiving a first handover command message including first handover assistance information indicative of a first pool of random access channel resources to be used by a terminal upon fallback to contention-based random access during a first handover processing;
selecting first random access channel resources as first attempt random access channel resources from the first pool of random access channel resources;
attempting a first random access to a target access point utilizing the first attempt random access channel resources;
storing, when attempting the first random access to the target access point utilizing attempt random access channel resources is unsuccessful, attempt related information to an attempt failure list;
receiving a second handover command message including second handover assistance information indicative of a second pool of random access channel resources to be used by the terminal upon fallback to contention-based random access during a second handover processing;

selecting second random access channel resources as second attempt random access channel resources from the second pool of random access channel resources;

attempting a second random access to the target access point utilizing the second attempt random access channel resources;

transmitting, when attempting the second random access to the target access point utilizing the second attempt random access channel resources is successful, the attempt failure list to the target access point;

trying, when a failure condition with respect to attempting the second random access to the target access point is met, to connect to a recovery access point; and transmitting, when the trying to connect to the recovery access point is successful, the attempt failure list to the recovery access point.

16. The method according to claim 15, further comprising selecting, when attempting the first random access to the target access point utilizing the first attempt random access channel resources is unsuccessful, the second random access channel resources as the first attempt random access channel resources from the first pool of random access channel resources.

17. The method according to claim 15, wherein the attempt related information comprises the following: attempt random access channel resources, a pool identity associated with the first pool of random access channel resources, information on at least one network slice, information on network slices the terminal was connected to when sending a measurement report triggering the handover, information on network slices the terminal was connected to before receiving the handover command, information on a transmit power with which a random access channel preamble associated with the first attempt random access channel resources is sent for attempting the first random access to the target access point utilizing the first attempt random access channel resources, a random access radio network temporary identifier of the first attempt random access channel resources, whether attempting the first random access to the target access point utilizing the first attempt random access channel resources utilized a contention-based random access procedure or a contention-free random access procedure, and a time of attempting the first random access to the target access point utilizing the first attempt random access channel resources.

18. The method according to claim 15, wherein the attempt failure list is transmitted with a random access channel report.

19. The method according to claim 15, wherein the handover processing is a conditional handover processing.

20. The method according to claim 15, wherein the target access point is a base station.

* * * * *